United States Patent Office 3,110,205
Patented Nov. 12, 1963

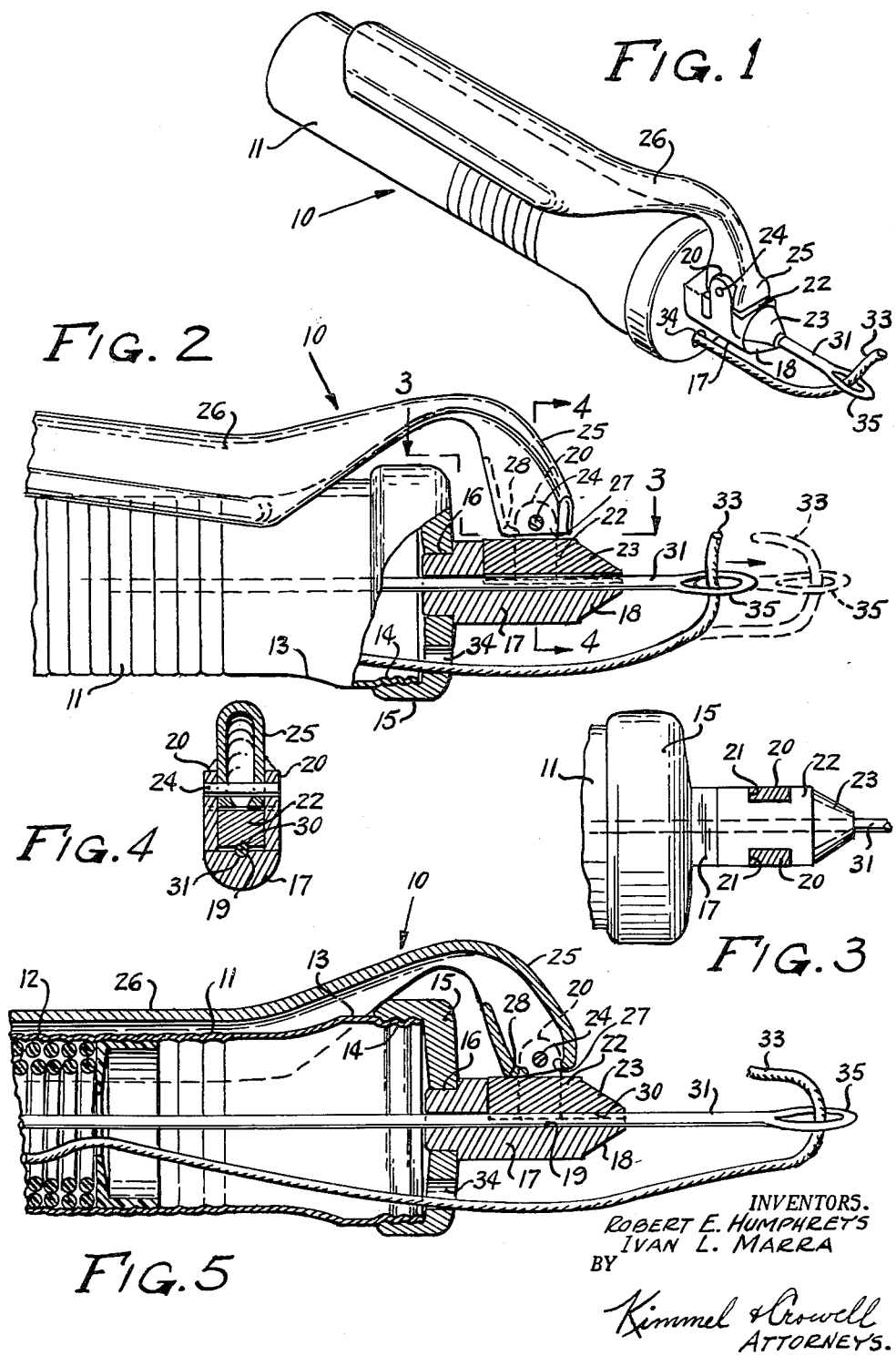

3,110,205
INJECTOR TOOL
Robert E. Humphreys and Ivan L. Marra, Butler, Pa., assignors, by direct and mesne assignments, to Small Business Administration, a Federal agency
Filed Oct. 17, 1961, Ser. No. 145,692
3 Claims. (Cl. 81—15.7)

This invention relates to an injector tool and has particular applicability to the insertion of puncture sealing material into a puncture in a tubeless vehicle tire.

A primary object of the invention is the provision of such a tool provided with a needle or inserter which may be readily adjusted to a variety of lengths to accommodate various thicknesses of tires from the tire of the common motor vehicle to extremely heavy duty truck tires or the like.

An additional object of the invention is the provision of such a device for inserting the puncture sealing material by means of an inserter needle wherein the needle is firmly clamped in its extended or retracted position during the insertion regardless of the extended length thereof.

A further and more specific object of the invention comprises the provision of an inserter tool particularly adapted for the insertion of the puncture repair material set forth in our co-pending application, Serial No. 2,676, filed January 15, 1960, entitled "Puncture Repair Material."

A still further object of the invention is the provision of a needle, particularly adapted for use with heavy duty tires which may be extended progressively as it is inserted into the puncture, thus avoiding the necessity of an excessively long and unsupported needle with its consequent weakness.

A still further object of the invention is the provision in a device of this character, of conical needle gripping jaws, which will serve automatically to clean any excessive amount of puncture sealing material from the needle as the same is retracted into the tool handle.

It is a further object of the invention to provide a rounded clamping handle construction which may be employed to clamp a pair of gripping jaws about the needle with a comparative minimum of pressure, and which may be readily released to permit retraction of the handle away from the tire after the needle has been inserted a portion of its length, to permit further insertion of the needle without in any way extending the exposed effective length thereof and rendering the same liable to breakage.

Still another object of the invention is the provision of a needle of this character which is of sufficient length to permit the extension of the tool into the puncture and through the outer wall of the tire into the interior thereof a distance equalling twice the thickness of the tire so that upon withdrawal a double thickness of the puncture repair material is permitted to remain in the puncture.

Still another object of the invention is the provision of a device of this character which is sturdy and durable in construction, reliable and efficient in operation, and relatively simple and inexpensive to manufacture and utilize.

Still other objects will in part be obvious and in part be pointed out hereinafter and disclosed in the accompanying drawing wherein there is shown a preferred form of this inventive concept.

In the drawings:

FIGURE 1 is a perspective view of one form of tool constructed in accordance with the instant invention.

FIGURE 2 is an enlarged view partially in section and partially in elevation showing the operative parts of the device.

FIGURE 3 is a sectional view taken substantially along the line 3—3 of FIG. 2 as viewed in the direction indicated by the arrows.

FIGURE 4 is a sectional view taken substantially along the line 4—4 of FIG. 2 as viewed in the direction indicated by the arrows; and FIGURE 5 is an enlarged sectional view similar to FIG. 2 but showing certain of the parts in a different position of adjustment, and showing additional internal components.

Similar reference characters refer to similar parts throughout the several views of the drawing.

Having reference now to the drawings in detail, the device of the instant invention is generally indicated at 10 and comprises a tube or cylinder 11 which is adapted to contain a roll 12 of puncture repair material, such for example as that disclosed in our above-mentioned co-pending application. The outer end of the tube 11 is flared as at 13 and externally threaded as at 14 for the reception of a closure of cap 15. The cap 15 has an opening 16 therein from which extends a lug 17 having a tapered extremity 18 which comprises a fixed jaw. The tapered extremity 18 is in the form of a cone, and is provided with a semi-circular bore 19 therethrough. Protuberances 20, fixed to opposite sides of the lugs 17, extend upwardly and engage in suitable slots 21 in the side walls of a loosely mounted upper jaw 22 to guide the same linearly in a direction transverse to the axis of the bore 19. The jaw 22 is also provided with a tapered frusto conical end portion 23, the portions 23 and 18 forming a clamping cone when in operative relation, since the member 22 comprises a movable jaw. The projections 20 extend above the top of the movable jaw 22 and carry a pivot pin 24 which extends across the top of jaw 22 to retain the same against excessive upward movement and which mounts in pivotal relation the end 25 of an operating handle or lever 26. The lower portion of the end 25 is tapered as at 27, and provided with a shoulder 28 at one end, the arrangement being such that when the handle portion 26 is clampingly engaged by the hand and compressed against the tube 11, the shoulder 28 bears against the movable jaw 22 to move jaw 22 downwardly or inwardly, guided by the engagement of protuberances 20 in slots 20a, to clamp the two jaws together. It is pointed out that the jaw 22 also carries a semicircular channel 30, the channels 30 and 19 forming a tubular passage through which extends a needle or inserter member 31, the latter being of substantial length and extending, as best shown in FIG. 5, centrally of the coil 12 of puncture repair material. The end 33 of the coil 12 passes through an opening 34 in cap 15 and thence through an eye 35 in the tip of needle 31, the arrangement being such that as is customary with such devices the needle is inserted into the puncture opening completely through the tire and then withdrawn, the puncture repair material which has been initially inserted by the forcing of the needle into the puncture opening is retained therein while a second or double layer of puncture repair material is drawn into the opening upon the withdrawal of the needle. The puncture repair material is then severed closely adjacent the surface of the tire and will retain the puncture in tightly sealed relation for the duration of the life of the tire.

In the use and operation of the device it will be readily apparent that upon the relaxation of pressure on handle 26 the needle 31 may be withdrawn to a desired extent from the container 11, this extent being sufficient to accomplish initial insertion into the puncture in the tire, regardless of its thickness, without extending the needle to a length which will render the same liable to breakage due to lack of support. After this portion of the needle has been inserted, pressure on handle 26 may be relaxed to permit withdrawal of the handle portion along the length of the needle a distance sufficient to permit the insertion of a further portion of the needle. This procedure may be repeated as often as may be necessary to insert the needle entirely through the wall of the tire and to a distance of at least twice the thickness of the tire wall so that upon withdrawal a double thickness of puncture sealing material is contained in the opening forming the puncture. After the operation of repairing the puncture is completed and the needle wholly withdrawn from the opening, the needle is automatically cleansed by retraction into the handle between the conical jaw members 22 and 18.

If desired, suitable indicia may be provided along the length of the needle to indicate the maximum required extension for car tires or truck tires of varying thickness. Alternatively, the needle may be graduated in numbered graduations as, for example, by inches, to indicate the amount of penetration by the needle at any given time during the operation of repair.

When the needle is entirely withdrawn into the container 11, it is to be noted that only the tip or eye extends beyond the clamping jaws, and the needle may, therefore, extend substantially the full length of tube 11, extending through the normal central opening in a roll of puncture repair material.

From the foregoing it will now be seen that there is herein provided an improved injector tool for tire puncture repair material which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

We claim:

1. An injector for tire puncture repair material comprising a tubular handle containing puncture repair material in cord form, said handle having an opening at one end, a closure cap for said opening having a central bore therethrough, a fixed jaw having a channel therein fixed in said base, a movable jaw mounted for movement toward and away from said fixed jaw, said movable jaw having an opposed channel therein aligned with said first-mentioned channel, an injector needle extending from the interior of said container through said channel, said needle having an eye at its outer end, said container having a second opening therein through which said cord of puncture material extends to pass through said eye, said needle being extensible and retractable between said jaws, and means for moving said movable jaw to clamp said needle in a selected position of extension, said movable jaw having guide slots therein, spaced parallel lugs extending from said fixed jaw into said guide slots permitting linear movement of said movable jaw toward and away from said fixed jaw, said means for moving said movable jaw including a pivot pin extending between said lugs over said movable jaw, retaining said movable jaw against displacement and an elongated transversely arcuate handle pivotally connected to said pin, said handle having a shoulder thereon movable to compress said movable jaw against said fixed jaw.

2. An injector for tire puncture repair material comprising a tubular handle containing puncture repair material in cord form, said handle having an opening at one end, a closure cap for said opening having a central bore therethrough, a fixed jaw having a channel therein fixed in said bore, a movable jaw mounted for movement toward and away from said fixed jaw, said movable jaw having an opposed channel therein aligned with said first-mentioned channel, an injector needle extending from the interior of said container through said channel, said needle having an eye at its outer end, said container having a second opening therein through which said cord of puncture material extends to pass through said eye, said needle being extensible and retractable between said jaws, and means for moving said movable jaw to clamp said needle in a selected position of extension, said movable jaw having guide slots therein, spaced parallel lugs extending from said fixed jaw into said guide slots permitting linear movement of said movable jaw toward and away from said fixed jaw, said means for moving said movable jaw including a pivot pin extending between said lugs over said movable jaw, retaining said movable jaw against displacement and an elongated transversely arcuate handle pivotally connected to said pin, said handle having a shoulder thereon movable to compress said movable jaw against said fixed jaw, each of said jaws terminating in a frusto-conical half portion surrounding said needle whereby said needle in operative position extends from the top of a truncated cone.

3. An injector for tire puncture repair material comprising a tubular handle containing puncture repair material in cord form, said handle having an opening at one end, a closure cap for said opening having a central bore therethrough, a fixed jaw having a channel therein fixed in said bore, a movable jaw mounted for movement toward and away from said fixed jaw, said movable jaw having an opposed channel therein aligned with said first-mentioned channel, an injector needle extending from the interior of said container through said channel, said needle having an eye at its outer end, said container having a second opening therein through which said cord of puncture material extends to pass through said eye, said needle being extensible and retractable between said jaws, and means for moving said movable jaw to clamp said needle in a selected position of extension, said movable jaw having guide slots therein, spaced parallel lugs extending from said fixed jaw into said guide slots permitting linear movement of said movable jaw toward and away from said fixed jaw, said means for moving said movable jaw including a pivot pin extending between said lugs over said movable jaw, retaining said movable jaw against displacement and an elongated transversely arcuate handle pivotally connected to said pin, said handle having a shoulder thereon movable to compress said movable jaw against said fixed jaw, each of said jaws terminating in a frusto-conical half portion surrounding said needle whereby said needle in operative position extends from the top of a truncated cone, said needle being of a length when extended to project into and through a heavy duty vehicle tire a distance at least equal to twice the thickness of the tire wall.

References Cited in the file of this patent

UNITED STATES PATENTS

| | | |
|---|---|---|
| 257,400 | Snider | May 2, 1882 |
| 616,109 | Kelly et al. | Dec. 20, 1898 |
| 706,183 | Jones et al. | Aug. 5, 1902 |
| 760,598 | Wynegar | May 24, 1904 |
| 908,708 | Stewart | Jan. 5, 1909 |
| 1,041,286 | Hoskins | Oct. 15, 1912 |
| 1,385,591 | Stafiej | July 26, 1921 |
| 1,766,333 | Forehand | June 24, 1930 |
| 2,040,713 | Shaffer | May 12, 1936 |
| 2,603,495 | Hermanson | July 15, 1952 |